US012153361B2

(12) United States Patent
Asami et al.

(10) Patent No.: US 12,153,361 B2
(45) Date of Patent: Nov. 26, 2024

(54) TRANSFER ROLLER, TRANSFER DEVICE, AND IMAGE FORMING APPARATUS

(71) Applicant: CANON KABUSHIKI KAISHA, Tokyo (JP)

(72) Inventors: Jun Asami, Shizuoka (JP); Taisuke Minagawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/182,974

(22) Filed: Mar. 13, 2023

(65) Prior Publication Data

US 2023/0305449 A1 Sep. 28, 2023

(30) Foreign Application Priority Data

Mar. 25, 2022 (JP) ................................ 2022-049279

(51) Int. Cl.
*G03G 15/16* (2006.01)

(52) U.S. Cl.
CPC ... *G03G 15/162* (2013.01); *G03G 2215/1614* (2013.01)

(58) Field of Classification Search
CPC .................... G03G 15/162; G03G 2215/1614
See application file for complete search history.

(56) References Cited

FOREIGN PATENT DOCUMENTS

| | | | | |
|---|---|---|---|---|
| JP | H10268671 A | | 10/1998 |
| JP | 2005062746 A | * | 3/2005 |
| JP | 2005077541 A | * | 3/2005 |
| JP | 2015179215 A | | 10/2015 |
| JP | 2018180487 A | | 11/2018 |

OTHER PUBLICATIONS

Machine tranlstion of JP 2005-062746 A, Satou et al., published on Mar. 10, 2005.*
Machine translation of JP 2005-077541 A, Tokushige et al., published on Mar. 24, 2005.*

* cited by examiner

*Primary Examiner* — Sophia S Chen
(74) *Attorney, Agent, or Firm* — Canon U.S.A., Inc. IP Division

(57) ABSTRACT

A transfer roller includes a shaft portion rotatable in an axial direction and an elastic portion covering an outer peripheral surface of the shaft portion, wherein an identification portion is provided on the outer peripheral surface of the shaft portion. On one side in the axial direction, the identification portion includes a first end portion located on a center side of the shaft portion and a second end portion located on an end side of the shaft portion in the axial direction. In a direction from the center side to the end side, the first end portion is located on an outer side of an end portion of a maximum sheet-passing area of a transferring material, and the second end portion is located on an inner side of the maximum sheet-passing area and on an outer side of an end portion of the elastic portion.

7 Claims, 8 Drawing Sheets

TRANSFER ROLLER, TRANSFER DEVICE, AND IMAGE FORMING APPARATUS

BACKGROUND

Field

The present disclosure relates to an image forming apparatus and a transfer roller or a transfer device used in the image forming apparatus. In particular, the present disclosure relates to an image forming apparatus and a transfer roller or a transfer device using an electrophotographic method.

Description of the Related Art

In recent years, as a transfer device used in an image forming apparatus, a contact transfer device that is not likely to generate ozone is widely known, as discussed in Japanese Patent Application Laid-Open No. H10-268671. The contact transfer device includes a transfer roller serving as a transfer unit that comes into contact with an image carrying member, and generally such a transfer roller includes a conductive shaft and a semiconductive member provided to surround the shaft.

A transfer nip is formed at the position where the transfer roller comes into contact with a photosensitive drum serving as the image carrying member. When a transfer voltage is applied to the transfer roller from a transfer power supply, a current flows from the transfer roller to the photosensitive drum. As a result, a toner image borne by the photosensitive drum is electrostatically transferred to a transferring material conveyed to the transfer nip.

It is known that some image forming apparatuses have a configuration in which a plurality of different types of transfer rollers can be mounted and are capable of recognizing the types of transfer rollers.

SUMMARY

The present disclosure is directed to providing a configuration with which the type of transfer roller can be easily identified.

According to an aspect of the present disclosure, a transfer roller that transfers a developer image to a transferring material includes a shaft portion configured to rotate around an axis of rotation in an axial direction, wherein a recessed identification portion is provided on an outer peripheral surface of the shaft portion and being recessed from the outer peripheral surface toward inside, and an elastically deformable elastic portion provided to cover at least part of the outer peripheral surface of the shaft portion, wherein end portions on both sides of the elastic portion are provided on outer sides of end portions on both sides of a maximum sheet-passing area of the transferring material in the axial direction, wherein, on one side in the axial direction, the identification portion includes a first end portion located on a center side of the shaft portion and a second end portion located on an end portion side of the shaft portion in the axial direction, and wherein, in a direction from the center side to the end portion side, the first end portion is provided on the outer side of the end portion of the maximum sheet-passing area of the transferring material, and the second end portion is provided on the outer side of the end portion of the maximum sheet-passing area of the transferring material and on an inner side of the end portion of the elastic portion.

Further features of the present disclosure will become apparent from the following description of exemplary embodiments with reference to the attached drawings.

DESCRIPTION OF THE EMBODIMENTS

Exemplary embodiments of the present disclosure will be described below in detail with reference to the drawings.

Figure 1:
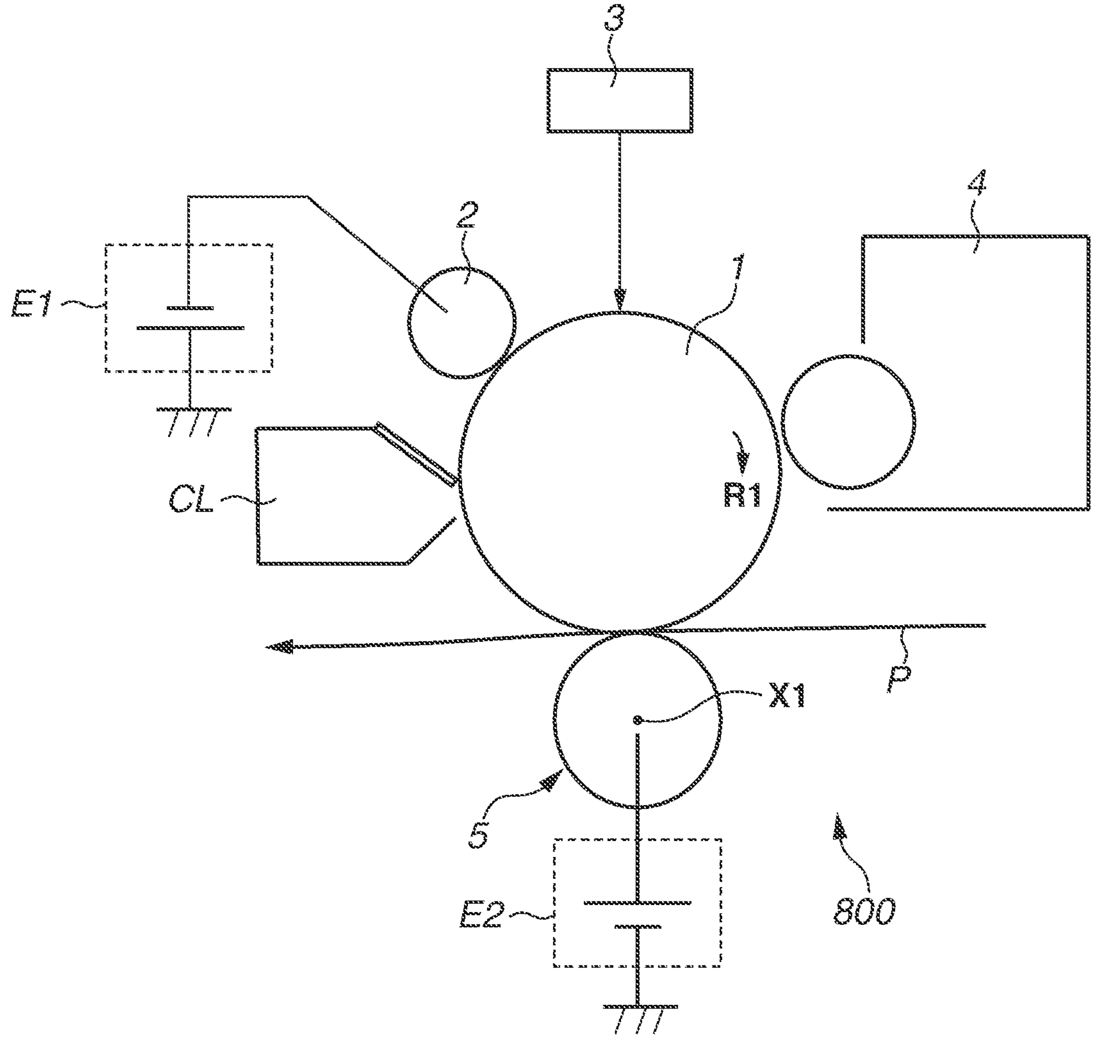
FIG. 1 is a schematic diagram illustrating an image forming apparatus according to a first exemplary embodiment.

FIG. 1 is a schematic configuration diagram of an image forming apparatus 800 according to a first exemplary embodiment of the present disclosure.

As illustrated in FIG. 1, the image forming apparatus 800 according to the present exemplary embodiment is a transfer-type electrophotographic apparatus employing a rotary-drum. An electrophotographic photosensitive drum 1 constitutes an image carrying member and is driven to rotate at a predetermined circumferential velocity (process speed) in a clockwise direction R1 of the arrow.

In the process of rotation, the outer peripheral surface of the photosensitive drum 1 is uniformly charged to a predetermined polarity and potential (approximately −600 V according to the present exemplary embodiment) by a charge roller 2 to which a charging bias is applied from a power supply E1 serving as a charging unit. Subsequently, in response to an exposure of an image corresponding to the target image information by an exposure unit 3, an electrostatic latent image of the target image information is formed on the outer peripheral surface of the photosensitive drum 1.

Subsequently, the electrostatic latent image is developed into a toner image by a toner developing unit 4 that uses a reversal developing method using negative toner. Then, the toner image is conveyed to a transfer portion between the photosensitive drum 1 and a transfer roller 5 serving as a transfer unit, and a transferring material P is fed at predetermined timing from a sheet feeding unit (not illustrated).

A transfer bias of approximately +1 KV to +5 KV is applied to the transfer roller 5 from a power supply E2. The toner image, which has undergone reversal development and is located on the outer peripheral surface of the photosensitive drum 1, is sequentially transferred to the transferring material P. The transferring material P, onto which the toner image has been transferred, is separated from the outer peripheral surface of the photosensitive drum 1 and introduced into a fixing unit (not illustrated) to undergo an image fixing process. The outer peripheral surface of the photosensitive drum 1 after the toner image is transferred is cleaned by a cleaning unit CL to remove adhering contaminants such as transfer residual toner, and the cleaned surface is used repeatedly for image formation.

According to the present exemplary embodiment, a plurality of transfer rollers 5 having different characteristics is usable (in combination) in the identical image forming apparatus 800. The difference in the characteristics is determined by an identification method for the transfer roller 5 described below. Results of the characteristics determination are first written to a memory in the apparatus 800 as identified information, and the apparatus 800 performs an optimal operation in accordance with the identified information.

An identification method for the transfer roller 5 according to the present exemplary embodiment and the transfer roller 5 having a configuration identifiable by the identification method will be described in detail.

Figure 2:
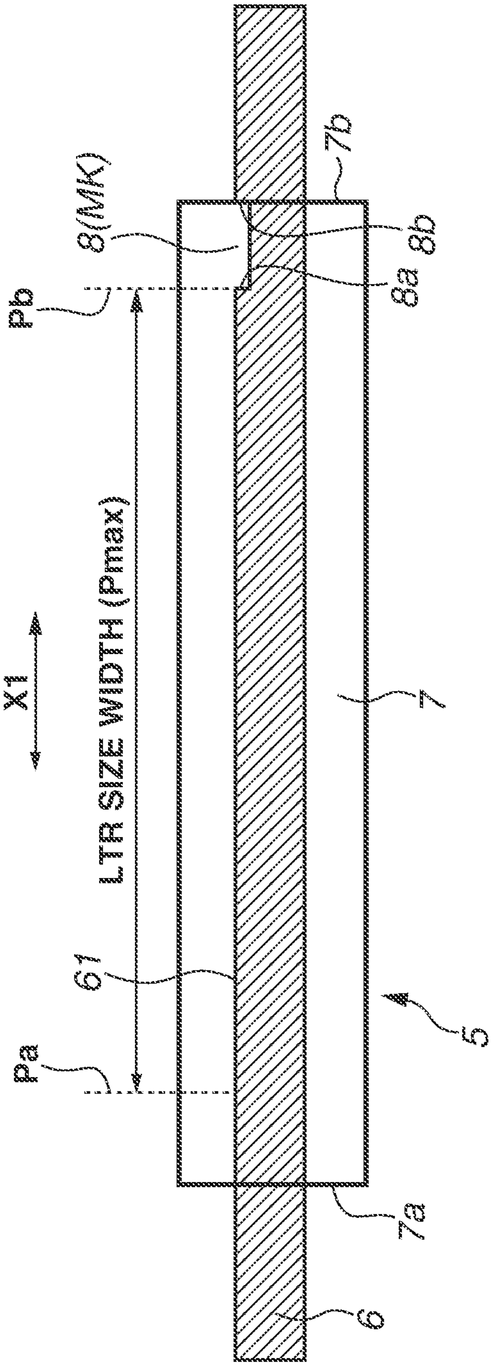
FIG. 2 is a schematic diagram illustrating a transfer roller according to the first exemplary embodiment.

FIG. 2 is a schematic diagram illustrating a conductive elastic roller (hereinafter referred to as the transfer roller) serving as the transfer unit. As illustrated in FIG. 2, the transfer roller 5 is used to transfer toner images onto the transferring material P and includes a conductive shaft 6 (shaft portion) configured to rotate around an axis of rotation in an axial direction X1 and a tube-like semiconductive member 7 (elastic portion) surrounding the conductive shaft 6. That is, the semiconductive member 7, which is an elastically deformable elastic portion, is provided to cover an outer peripheral surface 61 of the conductive shaft 6.

The conductive shaft 6 is made of metal material such as stainless steel (SUS), conductive resin, etc. The conductive shaft 6 having an outer diameter larger than the inner diameter of the semiconductive member 7 is pressed into the semiconductive member 7 to be mechanically fixed to the semiconductive member 7 without adhesive.

According to the present exemplary embodiment, a recessed step portion 8 (step portion) having a predetermined width is provided on at least one side of the conductive shaft 6 for identification of the transfer roller 5.

Specifically, according to the present exemplary embodiment, the recessed step portion 8 is configured to have less effect on the transferability of toner images and the conveyance performance of recording materials (transferring materials). Specifically, in the longitudinal direction, the recessed step portion 8 is provided on the outer side of an end portion Pa or Pb of a maximum sheet-passing width (maximum sheet-passing area Pmax) of the transferring material P and is provided on the inner side of the end portion of the semiconductive member 7. This avoids interference with a conductive bearing portion 11 (bearing member—FIG. 6) described below.

That is, in the transfer roller 5 according to the present exemplary embodiment, the outer peripheral surface 61 of the conductive shaft 6 is provided with a recessed identification portion MK that is recessed from the outer peripheral surface 61 toward inside.

In the axial direction X1, end portions 7*a* and 7*b* on both sides of the semiconductive member 7 are provided on the outer sides of the end portions Pa and Pb on both sides of the maximum sheet-passing area Pmax of the transferring material P, respectively.

On one side in the axial direction X1, a first end portion 8*a* of the recessed step portion 8 (recessed portion) configured as the identification portion MK located closer to a center side of the conductive shaft 6 in the axial direction X1 is provided on the outer side of the end portion Pb of the maximum sheet-passing area Pmax of the transferring material P in the axial direction X1.

A second end portion 8*b* of the recessed step portion 8 located further from the center side of the conductive shaft 6 in the axial direction X1 that the first end portion 8*a* also is provided on the outer side of the end portion Pb of the maximum sheet-passing area Pmax of the transferring material P in the axial direction X1 and is provided on the inner side of the end portion 7*b* of the semiconductive member 7 (center side) in the axial direction X1.

According to the present exemplary embodiment, the identification portion MK of the transfer roller 5 is formed by at least one of a scribing line, a step, and a polishing mark. It is also possible to form the identification portion MK by combining two or more thereof. According to the present exemplary embodiment, different types of transfer rollers 5A, 5B, and 5C, which are to be identified by the identification portion MK, are used (in combination) in the identical image forming apparatus 800.

According to the present exemplary embodiment, specific examples of the identification portion MK include the recessed step portion 8 (step portion) having a recessed shape. At least one or any combination of the width, area, depth, number, interval, and shape of the recessed step portion 8 according to the present exemplary embodiment achieves the function of the identification portion MK.

According to the present exemplary embodiment, the longitudinal width of the semiconductive member 7 is 222 mm, and the LTR size, which is the maximum sheet-passing width of the image forming apparatus 800, is 216 mm. Therefore, the end portions 7*a* and 7*b* of the semiconductive member 7 are located further outside by approximately 3 mm than the end portions Pa and Pb of the recording material, respectively. In this embodiment, the maximum sheet-passing width of the image forming apparatus 800 is LTR size. However, the present disclosure is not limited to this, and the maximum sheet-passing width can be appropriately set according to the specifications of the image forming apparatus.

To manufacture the transfer roller 5, an adjusted conductive rubber composition is first extruded continuously into a tubular shape through a mouth of an extruder head. Subsequently, the extruded tube, still elongated without being cut, is passed through a microwave cross-linking device and then a hot-air cross-linking device. This causes continuous foam formation and cross-linking to form a tubular foam (the semiconductive member 7).

Subsequently, the tubular foam is cut into a predetermined length and a core metal (the conductive shaft 6) is inserted into the tube. Then, after cooling, the outer peripheral surface of the semiconductive member 7 is polished to obtain a predetermined outer diameter. Various polishing methods such as dry traverse polishing may be employed.

The materials of the semiconductive member 7 may include rubber, a cross-linking component to cross-link the rubber, a foaming component to foam the rubber, and anion potassium salt containing a fluoro group and a sulfonyl group in the molecule. The rubber may be formed by a conductive rubber composition containing at least one selected from the group consisting of styrene butadiene rubber (SBR) and nitrile butadiene rubber (NBR), and epichlorohydrin rubber.

The resistance value of the semiconductive member 7 is measured under normal temperature and humidity in a state where the semiconductive member 7 is attached under pressure to a grounded aluminum drum with a load of 400 g, the aluminum drum is rotated at a peripheral speed of approximately 120 mm/sec, and a voltage of 2.0 KV is applied to the conductive shaft. That is, the resistance value may be calculated from the applied voltage value and the measured current value. According to the present exemplary embodiment, the calculated resistance value is approximately 5.0×107Ω.

Figure 3A:
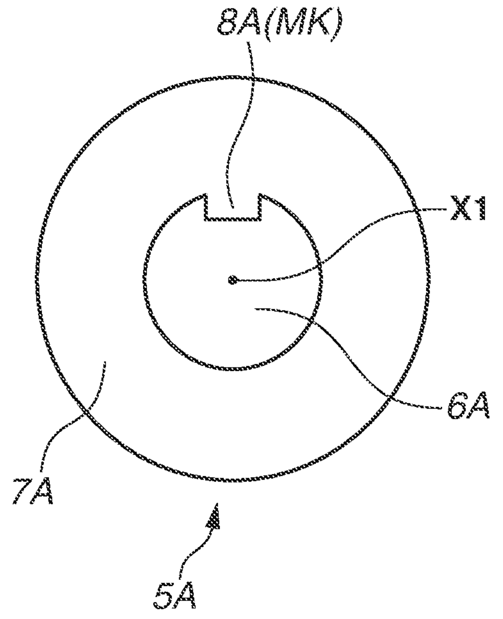
FIGS. 3A, 3B, and 3C are a schematic diagram illustrating a recessed step of the transfer roller according to the first exemplary embodiment.
Figure 3B:
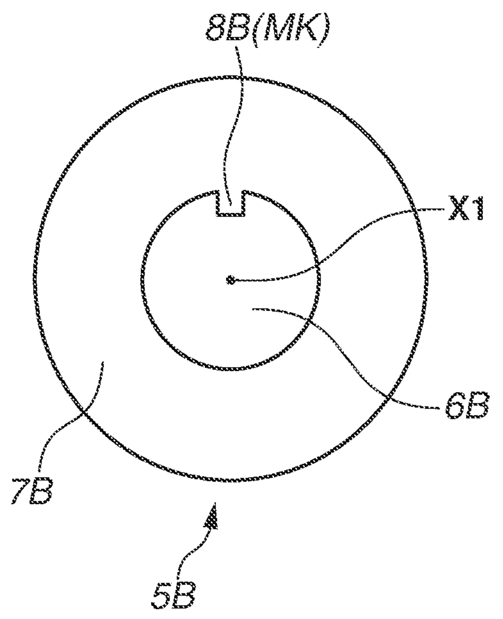
Figure 3C:
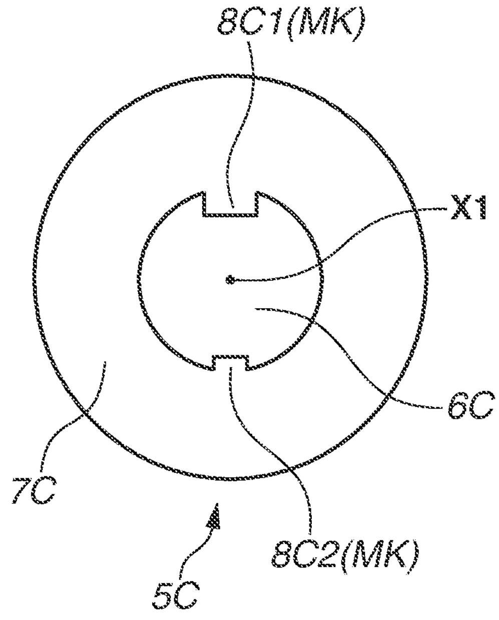

FIGS. 3A to 3C are schematic cross-sectional views illustrating the positions corresponding to the recessed step portion 8 of the transfer roller 5. As illustrated in FIGS. 3A to 3C, the different types of transfer rollers 5A, 5B, and 5C are all transfer rollers that are used in combination in the image forming apparatus 800 according to the present exemplary embodiment. In all the transfer rollers 5A, 5B, and 5C, semiconductive members 7A, 7B, and 7C having a wall thickness of 4.5 mm are formed on conductive shafts 6A, 6B, and 6C having an outer diameter of 5 mm, respectively, and the outer diameter of each of the transfer rollers 5A, 5B, and 5C is 14.0 mm.

The semiconductive members 7A, 7B, and 7C differ from each other in any of the material, formulation, manufacturing condition, and manufacturing method. Therefore, the semiconductive members 7A, 7B, and 7C have various different characteristics such as foam shape and surface resistance. Thus, the transfer rollers 5A, 5B, and 5C have different characteristics such as conveyance performance, discharge characteristics, and degree of durability and deterioration.

According to the present exemplary embodiment, recessed step portions 8A, 8B, and 8C (including 8C1 and 8C2 to be described below) are provided on the conductive shafts 6A, 6B, and 6C, respectively, as markings with which differences in the types of transfer rollers 5A, 5B, and 5C may be identified.

As illustrated in FIGS. 3A to 3C, these recessed step portions (8A to 8C) differ from each other in the width and number, and therefore the transfer rollers 5A to 5C may be identified based on the difference in shape and pattern. Specifically, the recessed step portion 8A illustrated in FIG. 3A, for example, is greater in width than the recessed step portion 8B illustrated in FIG. 3B. Recessed step portions 8C1 and 8C2 illustrated in FIG. 3C are larger in number than those illustrated in FIG. 3A or FIG. 3B. The recessed step portion 8C1 is configured to have a phase deviation of 180° with respect to the recessed step portion 8C2 and also has a different width from that of the recessed step portion 8C2.

Thus, for the identifiability (type) of the recessed step portions 8A to 8C, the recessed step portions 8A to 8C are configured differently based on the shapes of the recessed step portions 8A to 8C, e.g., widths, depths, or the phase or number of the recessed step portions 8A to 8C, or a combination thereof so that the identification function may be provided. The present exemplary embodiment is not limited to those illustrated in FIGS. 3A to 3C.

Figure 4:
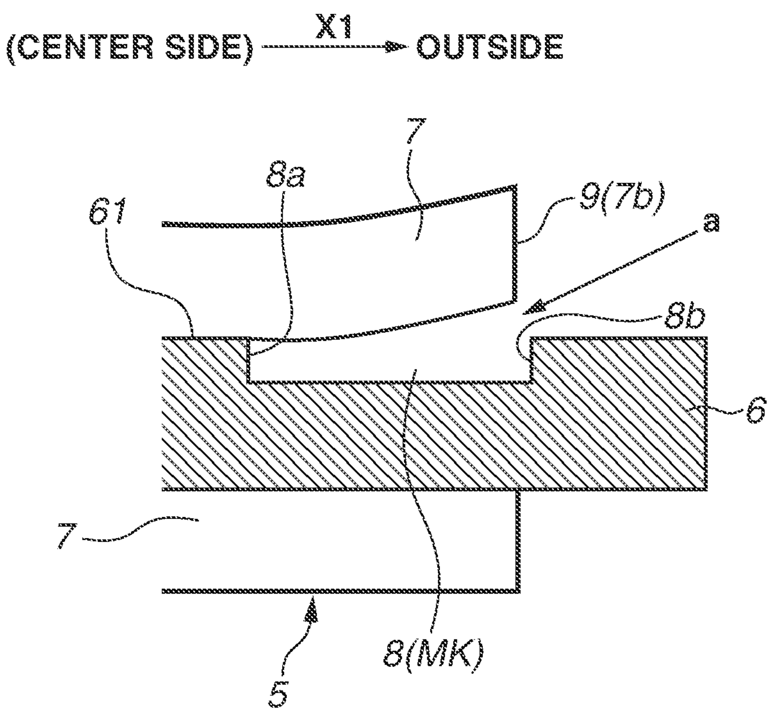
FIG. 4 is a schematic diagram illustrating an identification method of the transfer roller according to the first exemplary embodiment.

FIG. 4 is an enlarged schematic diagram illustrating an area near the recessed step portion 8 of the transfer roller 5. An example of an identification method of the transfer roller 5 will be described in detail with reference to FIG. 4.

First, as a simple method, the shape of the recessed step portion 8 is visually checked along an arrow direction a from the side of an end surface 9 of the end portion 7*b* of the semiconductive member 7 in the longitudinal direction. In a case where the recessed step portion 8 is located on the inner side of the position of the end surface 9 of the semiconductive member 7 in the longitudinal direction (cannot be visually checked), the end surface 9 of the semiconductive member 7 is slightly raised upwards as illustrated in FIG. 4 so that the recessed step portion 8 may be checked.

The checked recessed step portion 8 makes it possible to identify the type of transfer roller 5 depending on the difference in shape and pattern of the recessed step portion 8. The way of checking the recessed step portion 8 and identifying the type of transfer roller 5 is not limited to visual checking, but the checking and identification may be performed by an automatic identification unit using, for example, an optical sensor or image recognition.

In order to easily raise the end surface 9 of the semiconductive member 7, it is desirable that no adhesive be applied to a contact portion (interface) between the semiconductive member 7 and the conductive shaft 6 (adhesive-less).

Figure 5:
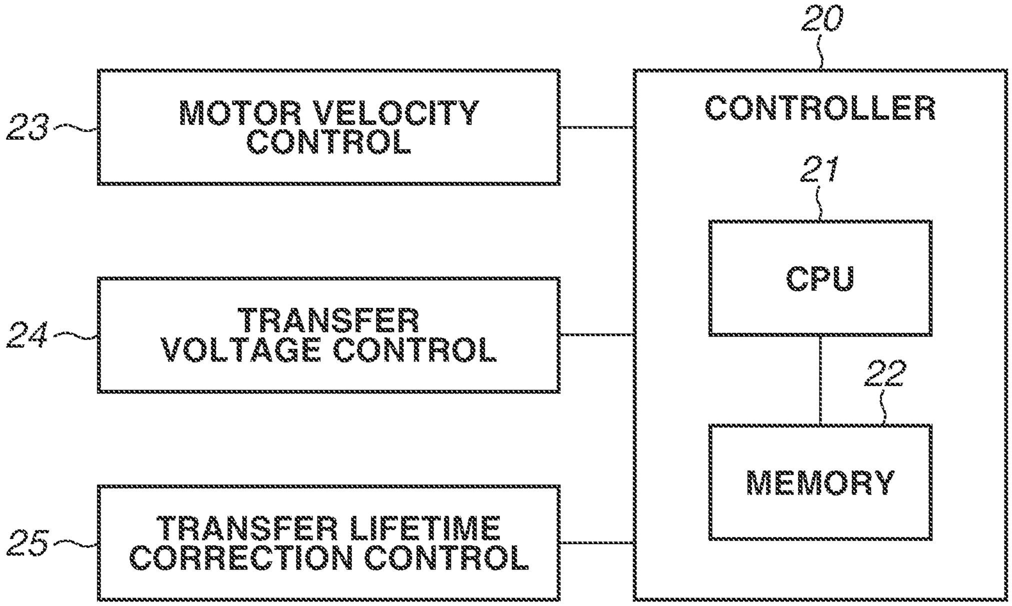
FIG. 5 is a schematic diagram illustrating a control configuration of the image forming apparatus according to the first exemplary embodiment.

FIG. 5 is a schematic diagram of a control configuration of a primary part of the image forming apparatus 800. As illustrated in FIG. 5, a controller (engine control unit) 20 serving as a control unit included in the image forming apparatus 800 includes a central processing unit (CPU) 21 serving as a central element that performs calculation processing, a memory 22 serving as a storage element, etc. The memory 22 stores information on the identified transfer roller 5, control programs and data tables associated with the information, etc.

According to the present exemplary embodiment, the controller 20 provides feedback to motor velocity control 23, transfer voltage control 24, and transfer lifetime correction control 25 in the apparatus based on the identification information on the transfer roller 5 stored in the memory 22. As a result, even in a case where the transfer rollers 5 having different characteristics are used in the image forming apparatus 800, optimal conveyance performance and transferability may be set in accordance with the identification information, and the lifetime of each transfer roller 5 may also be detected.

Figure 6:
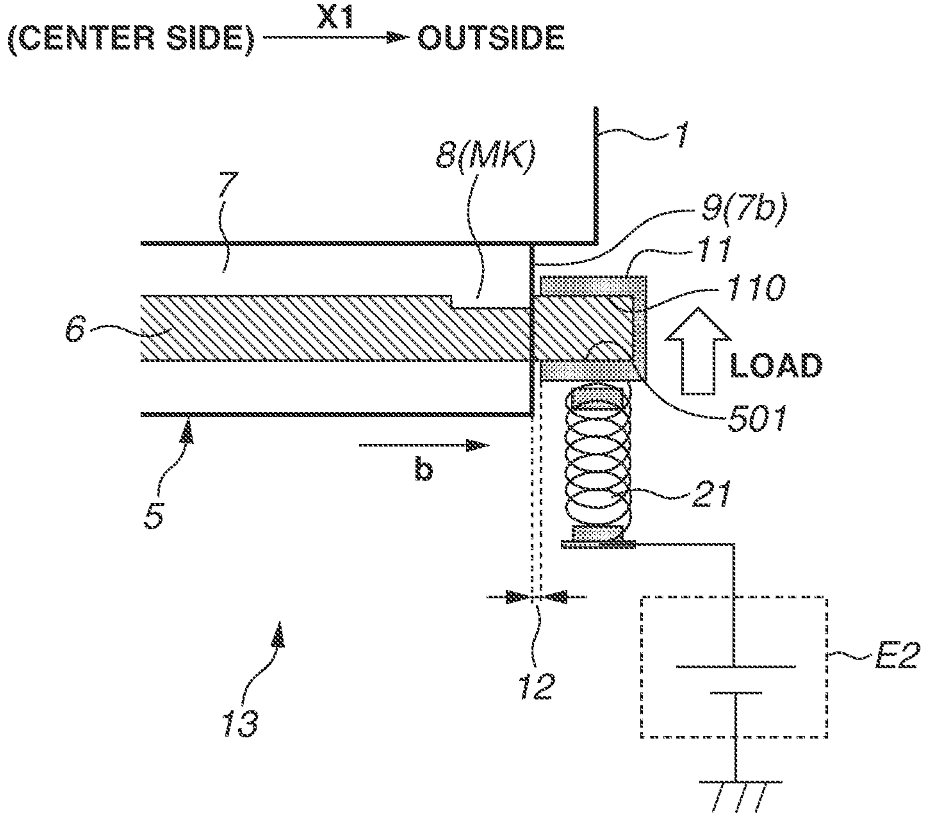
FIG. 6 is a schematic diagram illustrating a transfer device according to the first exemplary embodiment.

FIG. 6 is a cross-sectional schematic view illustrating a transfer device 13 on one side in the longitudinal direction. As illustrated in FIG. 6, in the transfer roller 5, an end portion 501 of the conductive shaft 6 is held by a holding portion 110 of the conductive bearing portion 11 (bearing member), and the transfer roller 5 is pressed against the photosensitive drum 1 by a transfer spring 21 with a total pressure of approximately 2.0 Kgf (1.0 Kgf per side). In the pressed state, a predetermined voltage is applied to the transfer roller 5 from the power supply E2 via the transfer spring 21 and the conductive bearing portion 11.

That is, according to the present exemplary embodiment, the transfer device 13 includes the transfer roller 5 and the conductive bearing portion 11.

The conductive bearing portion 11 includes the holding portion 110 that rotatably holds the end portion 501 of the transfer roller 5 in the axial direction X1. The image forming apparatus 800 includes the transfer roller 5 or the transfer device 13 and the photosensitive drum 1. In the following description, with regard to the direction from the center side of the conductive shaft 6 to the end portion side of the conductive shaft 6 in the axial direction of the conductive shaft 6, the center side is referred to as the inner side, and the end portion side is referred to as the outer side.

A clearance 12 is a gap between two end surfaces of the semiconductive member 7 and the conductive bearing portion 11. A gap (the clearance 12) of approximately several hundred μm is secured in a case where the transfer roller 5 moves farthest along an arrow direction b (thrust direction). A gap of approximately several hundred μm is the minimum distance where the semiconductive member 7 and the conductive bearing portion 11 are unlikely to interfere with each other even in consideration of damages to the rubber of the transfer roller 5 so that the size of the transfer device 13 may be further reduced.

The recessed step portion 8 is located on the inner side of the end surface 9 of the semiconductive member 7. Therefore, even when the transfer roller 5 moves farthest along the arrow direction b (thrust direction), the recessed step portion 8 is less likely to interfere with the conductive bearing portion 11 and is less likely to act on scraping of the conductive bearing portion 11, as illustrated in FIG. 6.

Figure 7:
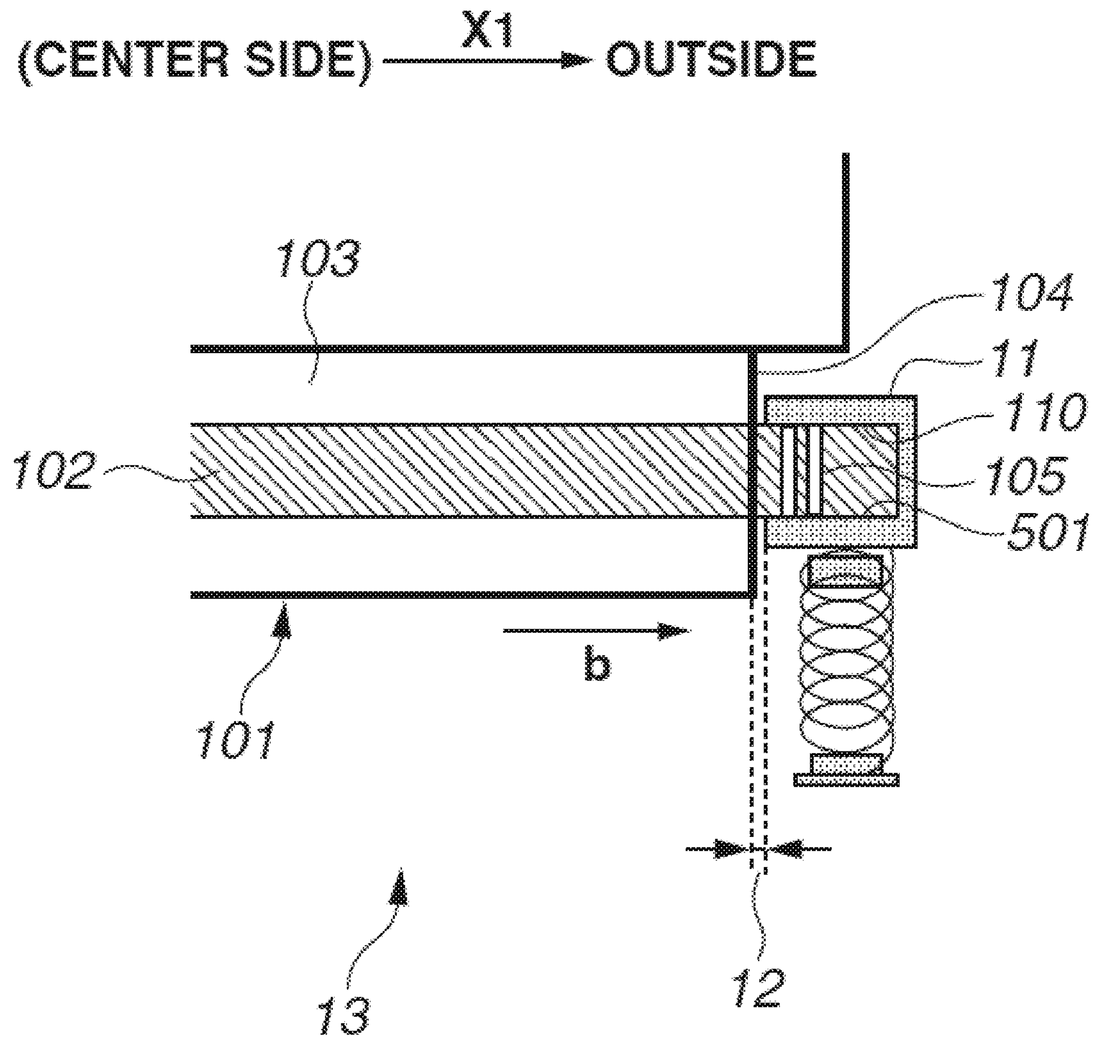
FIG.7 Prior Art
FIG. 7 is a schematic diagram illustrating a transfer roller of a transfer device according to a comparative example of the first exemplary embodiment.

FIG. 7 is a cross-sectional schematic view illustrating a comparative example in which a conventional transfer roller 101 is provided in the small-size transfer device 13 according to the present exemplary embodiment.

The conventional transfer roller 101 illustrated in FIG. 7 includes a marking including a recessed step 105 on the outer side of a rubber end 104 of a semiconductive member 103 on a conductive shaft 102. The recessed step 105 has scribing lines in the circumferential direction by cutting out part of the conductive shaft 102 for the purpose of identifying the transfer roller 101.

Even conventionally, the transfer roller 101 may be identified by changing the type and number of markings. However, even when the recessed step 105 has one scribing line, a longitudinal width of approximately several mm is needed due to its machining accuracy. Therefore, it is difficult to provide the recessed step 105 in the clearance 12 of approximately only several hundred μm.

That is, when the conventional transfer roller 101 illustrated in FIG. 7 moves farthest along the arrow direction b (thrust direction), the recessed step 105 may interfere with the inner surface of the conductive bearing portion 11. Therefore, in the conventional transfer roller 101, the recessed step 105 (the grooved surface thereof) slides against the inner peripheral surface of the conductive bearing portion 11 along with the image forming operation of the image forming apparatus 800, which promotes wear of the bearing.

When the wear of the bearing is excessively promoted, the strength and surface properties of the bearing portion may be degraded. This leads to concern about detachment and rotation failure of the transfer roller and may result in a decrease in the conveyance performance of recording materials (sheets) and transferability (image quality of transferred images) of the image forming apparatus.

Table 1 indicates the results of comparison between the conventional transfer roller 101 and the transfer roller 5 according to the present exemplary embodiment regarding the identifiability of the transfer rollers and the results of evaluation of the bearing wear due to the use over a period of time when the transfer rollers 101 and 5 are installed in the transfer device according to the present exemplary embodiment.

TABLE 1

| | Conventional art | Present Exemplary Embodiment |
|---|---|---|
| Identifiability of Transfer Roller | Desirable | Desirable |
| Bearing Wear (Durability) | Undesirable | Desirable |

As indicated in Table 1, both the transfer roller 101 the conventional art and the transfer roller 5 the present exemplary embodiment are identifiable using the recessed step provided on the shaft of the transfer roller.

In the transfer roller 101 according to the conventional art, the recessed step 105 on the shaft is located on the outer side of the rubber end 104 of the semiconductive member 103 and is therefore directly visible. In the transfer roller 5 according to the present exemplary embodiment, the recessed step portion 8 on the shaft is covered by the semiconductive member 7 on the inner side of the rubber end of the semiconductive member 7, but can be visually recognized (identified) by raising the end surface of the semiconductive member 7.

Regarding wear of the bearing portion due to the use over a period of time, a sheet-passing experiment corresponding to testing for the lifetime of the image forming apparatus was conducted while the transfer roller was moved in the thrust direction (the direction b) to evaluate durability.

As indicated in Table 1, in the transfer roller 101 according to the conventional art, the recessed step 105 on the shaft is located on the outer side of the rubber end 104 of the semiconductive member 103, and therefore the recessed step 105 on the shaft and the inner peripheral surface of the conductive bearing portion 11 interfere with each other. Advanced wear of the conductive bearing portion 11, and a reduction in sheet conveyance performance and image quality were observed.

Conversely, in the transfer roller 5 according to the present exemplary embodiment, the recessed step portion 8 is covered by the semiconductive member 7 on the inner side of the rubber end of the semiconductive member 7, and therefore the recessed step portion 8 on the shaft and the conductive bearing portion 11 are unlikely to interfere with each other. As a result, no reduction in sheet conveyance performance or image quality due to wear of the conductive bearing portion 11 was observed.

The presence of the recessed step on the shaft results in providing a gap (space) between the conductive shaft and the semiconductive member in the radial direction. Thus, there is a possibility of local changes in the shape of the transfer nip, uneven transfer current, or the like, on the end portion in the longitudinal direction. Conversely, according to the present exemplary embodiment, the recessed step portion 8 is provided on the outer side of the maximum sheet-passing width in the longitudinal direction, and thus there is little effect on transferability and conveyance performance within the printing area and the sheet-passing area.

Although the transfer configuration of the monochrome image forming apparatus 800 is described according to the present exemplary embodiment, the present exemplary embodiment is also applicable to the transfer configuration of color image forming apparatuses using an intermediate transfer belt and a transfer roller used in that configuration.

As described above, according to the present exemplary embodiment, the recessed step portion 8 is provided on the outer peripheral surface 61 of the conductive shaft 6 of the transfer roller 5, and the recessed step portion 8 is provided on the inner side of the rubber end surface in the longitudinal direction so that the interference between the recessed step portion 8 and the conductive bearing portion 11 can be prevented while identifiability of the transfer roller 5 is achieved. This makes it easier to avoid wear of the bearing.

Thus, the use of the identification portion MK and the identification method described above makes it easier to achieve a reduction in the size of the transfer roller 5 and the image forming apparatus using the transfer roller 5 and makes it easier to secure transferability, conveyance performance, and durability of the transfer device 13.

A transfer device according to a second exemplary embodiment of the present disclosure is basically similar to that according to the first exemplary embodiment, and the differences will be described below.

An identification portion for identifying a transfer roller according to the present exemplary embodiment is different from that according to the first exemplary embodiment. The description of a configuration similar to that according to the first exemplary embodiment is omitted below.

Figure 8:
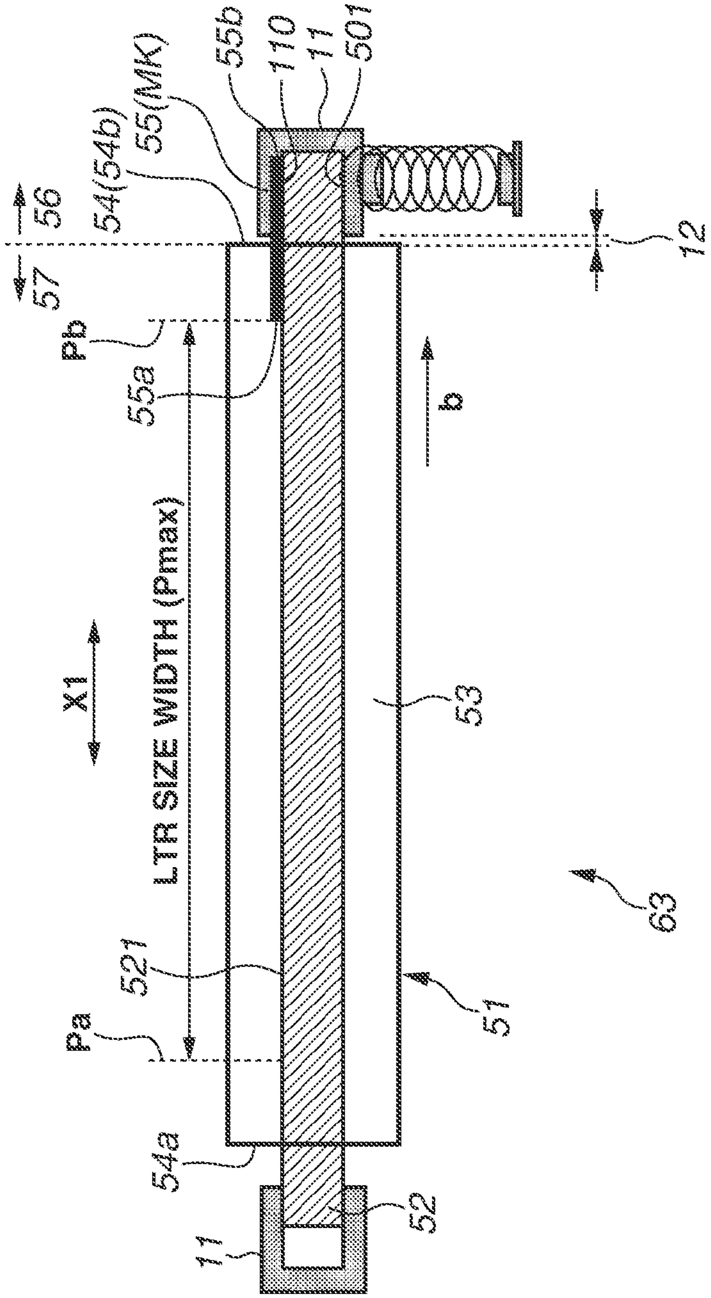
FIG. 8 is a schematic diagram illustrating a transfer roller and a transfer device according to a second exemplary embodiment.

FIG. 8 is a schematic diagram illustrating a transfer roller 51 and a transfer device 63 according to the second exemplary embodiment. As illustrated in FIG. 8, the transfer roller 51 includes a conductive shaft 52 and a tube-like semiconductive member 53 surrounding the conductive shaft 52. The conductive shaft 52 is made of metal material such as SUS, conductive resin, etc. The conductive shaft 52 having an outer diameter larger than the inner diameter of the semiconductive member 53 is pressed into the semiconductive member 53 to be mechanically fixed to the semiconductive member 53 without adhesive.

In the transfer roller 51, end portions of the conductive shaft 52 are rotatably held by the conductive bearing portions 11.

The clearance 12 of approximately several hundred μm, which is the minimum distance that does not (is not likely to) cause the semiconductive member 53 and the conductive bearing portion 11 to interfere with each other, is obtained between the respective end surfaces of the semiconductive member 53 and the conductive bearing portion 11, which results in a reduction in the size of the transfer device 63.

The conductive shaft 52 includes, on at least one side thereof, a marking 55 formed by material coating to identify the transfer roller 51. Specifically, according to the present exemplary embodiment, the transfer roller 51 includes the conductive shaft 52 (shaft portion) configured to rotate around the axis of rotation in the axial direction X1 and the semiconductive member 53 provided to cover an outer peripheral surface 521 of the conductive shaft 52. The semiconductive member 53 is formed by an elastic portion configured to be elastically deformed.

On one side in the axial direction X1, the identification portion MK including the marking 55 (marking portion) formed by material coating, is provided on the outer peripheral surface 521 of the end portion of the conductive shaft 52.

As illustrated in FIG. 8, according to the present exemplary embodiment, on one side in the axial direction X1, a first end portion 55*a* of the identification portion MK, which is located on the center side in the axial direction X1, is provided on the inner side (the center side) of an end portion 54*b* of the semiconductive member 53 in the axial direction X1. On the other hand, a second end portion 55*b* of the identification portion MK, which is located on the outer side opposite of the center side in the axial direction X1, is provided on the outer side of the end portion 54*b* of the semiconductive member 53 in the axial direction X1.

The present disclosure is not limited to the present exemplary embodiment, and for example, both the first end portion 55*a* and the second end portion 55*b* of the identification portion MK may be provided on the inner side (center side) of the end portion 54*b* of the semiconductive member 53 in the axial direction X1. Conversely, both the first end portion 55*a* and the second end portion 55*b* of the identification portion MK may be provided on the outer side of the end portion 54*b* of the semiconductive member 53 in the axial direction X1.

According to the present exemplary embodiment, in the axial direction X1, an end portion 54*a* and the end portion 54*b* on both sides of the semiconductive member 53 are provided on the outer side of the end portions Pa and Pb on both sides of the maximum sheet-passing area Pmax of the transferring material P, respectively.

According to the present exemplary embodiment, the volume resistivity of the marking 55 (constituent material) is smaller than the volume resistivity of the semiconductive member 53.

According to the present exemplary embodiment, the different types of transfer rollers 51, which are identified based on the identification portion MK, are usable in the identical image forming apparatus 800. The identification portion MK is configured to be identified based on at least one or any combination of the width, area, number, interval, and shape of the marking 55.

For the marking 55, it is desirable to use oil-based ink, or the like, which is a material easy to transcribe on metal and having strong adherence properties. The materials of the oil-based ink include organic solvents such as ketone, alcohol, and ethyl acetate, organic pigments such as carbon black, or dyes such as phthalocyanine, and resins such as acrylic and maleic acid.

The marking 55 is formed by applying other additives such as conductive agent, plasticizer, antioxidant, and ultraviolet absorber.

The marking 55 is desirably applied to a marking area 56 located on the outer side of than a rubber end surface 54 of the semiconductive member 53. The marking area 56 is visually recognizable without being covered with rubber. Therefore, the transfer roller 51 can be easily identified without raising the end surface 54 of the semiconductive member 53 in contrast to the first exemplary embodiment.

As the clearance 12 is very narrow, it is possible that part of the marking area 56 interferes with the inner peripheral surface of the conductive bearing portion 11 depending on the coating accuracy. However, as the marking 55 is made of a resin material, there is little concern about promotion of wear of the conductive bearing portion 11.

Furthermore, it is possible that part of the marking area 56 is removed due to sliding against the conductive bearing portion 11. In this case, the identifiability of the transfer roller 51 may be reduced after a period of use. To handle this, the marking 55 is desirably applied to a marking area 57 that is covered with the rubber on the inner side of the rubber end surface 54 of the semiconductive member 53.

The marking 55 in the marking area 57 is always covered with the rubber. Therefore, the marking 55 does not slide against the conductive shaft 52 throughout the period of use and is not likely to disappear. That is, the transfer roller 51 may be identified not only initially when the transfer roller 51 is new but also throughout the period of use.

Therefore, in addition to the initial identification, it is also possible to identify, from the marking 55, the type of the transfer roller 51 that causes a failure in the conveyance performance, transferability, or the like, of the apparatus, for example, as the investigation of the failure.

The marking area 57 is desirably provided on the outer side of the maximum sheet-passing width in the longitudinal direction in consideration of effects on transferability and conveyance performance in the printing area and the sheet-passing area. In some types of material coating, for example, such marking with an oil-based pen results in a thin coating layer and is unlikely to cause local shape changes of the transfer nip in the coating area.

When a conductive agent is added to a coating material (coating area), uneven transfer currents in the marking portion are less likely to occur. Therefore, when the identification portion MK includes the marking portion made of the coating material, failures are unlikely to occur even if the marking area is extended toward the inner side of the maximum sheet-passing width and interferes with the printing area or the sheet-passing area.

For the marking portion described according to the present exemplary embodiment, the variation of identification may be increased depending on the combination of coating width, interval, and number. That is, the identification portion MK may be formed by any combination of marking portions.

To suppress uneven transfer currents in the marking portion, the value of the volume resistivity of the coating agent is desirably lower than that of the semiconductive member 53.

Next, the evaluation of the second exemplary embodiment will be described by using Table 2. Table 2 indicates the results of performing the same evaluation as that in Table 1 according to the first exemplary embodiment with the transfer roller 51 according to the second exemplary embodiment.

For the transfer roller 51 used in the evaluation, an oil-based pen is used for material coating, and the coating width extends from the end portion of the maximum sheet-passing width illustrated in FIG. 8 to the area interfering with the inner peripheral surface of the conductive bearing portion 11.

TABLE 2

| | Conventional Art | First Exemplary Embodiment | Second Exemplary Embodiment |
|---|---|---|---|
| Identifiability of Transfer Roller | Desirable | Desirable | Desirable |
| Bearing Wear (Durability) | Undesirable | Desirable | Desirable |

Under the above conditions, the identifiability of the transfer roller 51 according to the present exemplary embodiment is desirable.

In particular, when the marking 55 necessary for identification is not hidden by the rubber of the semiconductive member 53, it is easy to visually check (identify) the marking 55 arranged on the outer side of the rubber end surface on the conductive shaft 52 without raising the rubber end surface as in the first exemplary embodiment.

Regarding the wear of the bearing due to the use over a period of time, a sheet-passing experiment for endurance corresponding to testing for the lifetime of the image forming apparatus was conducted while the transfer roller 51 was moved in the thrust direction (the direction b), and the durability was evaluated.

Although the material coating surface interfered with the conductive bearing portion 11, the transfer roller 51 according to the present exemplary embodiment resulted in “desirable” with minor wear in the conductive bearing portion 11 due to the marking 55 formed by the material coating. Furthermore, no reduction in sheet conveyance performance or image quality due to the wear of the conductive bearing portion 11 was observed.

As described above, according to the second exemplary embodiment, the marking 55 formed by the material coating is provided on the conductive shaft 52 of the transfer roller 51, and the coating area is provided on the outer side of the rubber end so that the transfer roller 51 can be easily identified.

The coating area is desirably extended to the inner side of the rubber end so that the transfer roller 51 can be identified even after a period of use. Furthermore, there is less concern about wear of the conductive bearing portion 11 due to sliding between the marking 55 formed by the material coating and the conductive bearing portion 11.

Thus, the configuration according to the second exemplary embodiment can secure transferability, conveyance performance, and durability of the transfer device 63 (the transfer roller 51) even for the compact configuration having a small clearance between the rubber end surface and the bearing.

As described above, according to an exemplary embodiment of the present disclosure, the recessed step is provided on the conductive shaft of the transfer roller, and the recessed step is provided on the inner side of the rubber end surface so that the interference between the recessed step and the bearing portion and the associated wear in the bearing portion can be reduced while the transfer roller is identifiable.

Furthermore, the marking formed by the material coating is provided on the conductive shaft of the transfer roller, and the coating area is provided on the outer side of the rubber end so that it is possible to easily identify the transfer roller while reducing wear of the bearing portion. The coating area is desirably extended to the inner side of the rubber end portion so that the transfer roller may be easily identified even after a period of use.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-049279, filed Mar. 25, 2022, which is hereby incorporated by reference herein in its entirety.

What is claimed is:

1. A transfer roller that transfers a developer image to a transferring material, the transfer roller comprising:

a shaft portion configured to rotate around an axis of rotation in an axial direction, a recessed identification portion being provided on an outer peripheral surface of the shaft portion and being recessed from the outer peripheral surface toward inside; and an elastically deformable elastic portion provided to cover at least part of the outer peripheral surface of the shaft portion, end portions on both sides of the elastically deformable elastic portion being provided on outer sides of end portions on both sides of a maximum sheet-passing area of the transferring material in the axial direction, wherein, on one side in the axial direction, the recessed identification portion includes a first end portion located on a center side of the shaft portion and a second end portion located on an end portion side of the shaft portion in the axial direction, and wherein, in a direction from the center side toward the end portion side, the first end portion is provided on one outer side of one end portion of the maximum sheet-passing area of the transferring material, and the second end portion is provided on another outer side of another end portion of the maximum sheet-passing area of the transferring material and on an inner side of one end portion of the elastically deformable elastic portion.

2. The transfer roller according to claim 1, wherein the recessed identification portion includes at least any one of a scribing line, a step, or a polishing mark formed on the outer peripheral surface of the shaft portion.

3. The transfer roller according to claim 1, wherein different types of transfer rollers configured to be used in an identical image forming apparatus are identifiable by identifying the recessed identification portion.

4. The transfer roller according to claim 1, wherein the recessed identification portion includes a step portion that is recessed from the outer peripheral surface, and wherein different types of transfer rollers are identifiable by identifying a difference in configurations of the step portion.

5. The transfer roller according to claim 4, wherein the difference in the configurations includes at least one or any combination of the following: width, area, depth, number, interval, or shape of the step portion.

6. A transfer device comprising:

the transfer roller according to claim 1; and a bearing member including a holding portion configured to rotatably hold an end of the shaft portion in the axial direction.

7. An image forming apparatus comprising:

a transfer device that includes the transfer roller according to claim 1, and includes a bearing member having a holding portion configured to rotatably hold an end of the shaft portion in the axial direction; and an image carrying member configured to bear the developer image.

* * * * *